US012334651B2

(12) United States Patent
Kim et al.

(10) Patent No.: US 12,334,651 B2

(45) Date of Patent: Jun. 17, 2025

(54) ANTENNA DEVICE INCLUDING RADOME AND BASE STATION INCLUDING ANTENNA DEVICE

(71) Applicant: SAMSUNG ELECTRONICS CO., LTD., Suwon-si (KR)

(72) Inventors: Yoongeon Kim, Suwon-si (KR); Seungho Choi, Suwon-si (KR); Seungtae Ko, Suwon-si (KR); Junsig Kum, Suwon-si (KR); Hyunjin Kim, Suwon-si (KR); Youngju Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 151 days.

(21) Appl. No.: 17/971,485

(22) Filed: Oct. 21, 2022

(65) Prior Publication Data

US 2023/0040927 A1 Feb. 9, 2023

Related U.S. Application Data

(63) Continuation of application No. PCT/KR2021/004491, filed on Apr. 9, 2021.

(30) Foreign Application Priority Data

Apr. 21, 2020 (KR) ........................ 10-2020-0047916

(51) Int. Cl.
*H01Q 7/00* (2006.01)
*H01Q 1/42* (2006.01)

(52) U.S. Cl.
CPC ................ *H01Q 7/00* (2013.01); *H01Q 1/42* (2013.01)

(58) Field of Classification Search
CPC ............ H01Q 7/00; H01Q 1/42; H01Q 1/405; H01Q 1/246; H01Q 3/06; H01Q 5/385; H01Q 19/005; H01Q 21/061
See application file for complete search history.

(56) References Cited

U.S. PATENT DOCUMENTS 5,777,581 A * 7/1998 Lilly .................... H01Q 19/005 343/745
6,104,348 A 8/2000 Karlsson et al.
(Continued)

FOREIGN PATENT DOCUMENTS

CN 10-7546481 A 1/2018
CN 113383582 9/2021
(Continued)

OTHER PUBLICATIONS

Extended European Search Report dated Aug. 3, 2023 issued in European Patent Application No. 21793799.4.
(Continued)

*Primary Examiner* — Raymond R Chai
(74) *Attorney, Agent, or Firm* — Nixon & Vanderhye P.C.

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. According to an embodiment o, an antenna device in a wireless communication system includes: an antenna module; and a radome covering at least a part of the antenna module, wherein the antenna module includes a first radiator disposed on one surface of the radome and at least one
(Continued)

second radiator spaced apart from the first radiator by a specified distance on the one surface to form a loop of the first radiator, wherein the at least one second radiator includes a plurality of gaps opening each of the loops.

18 Claims, 23 Drawing Sheets

(56) References Cited

U.S. PATENT DOCUMENTS

| | | | |
|---|---|---|---|
| 7,081,865 B2 | 7/2006 | Wu et al. | |
| 7,099,686 B2 | 8/2006 | Ro et al. | |
| 8,497,812 B2 | 7/2013 | Harokopus et al. | |
| 9,979,078 B2 | 5/2018 | Koskiniemi | |
| 11,516,691 B2 | 11/2022 | Li et al. | |
| 2005/0054317 A1 | 3/2005 | Ro et al. | |
| 2005/0062673 A1 | 3/2005 | Wu et al. | |
| 2010/0097271 A1* | 4/2010 | Chang | H01Q 1/425 343/700 MS |
| 2013/0050037 A1* | 2/2013 | Takemura | H01Q 19/28 343/837 |
| 2014/0118196 A1* | 5/2014 | Koskiniemi | H01Q 21/205 343/702 |
| 2016/0043479 A1 | 2/2016 | Tatarnikov et al. | |
| 2018/0159211 A1* | 6/2018 | Biancotto | H01Q 1/42 |
| 2018/0198212 A1 | 7/2018 | Rodriguez | |
| 2018/0219281 A1 | 8/2018 | Sudo et al. | |
| 2022/0224013 A1* | 7/2022 | Fabrega Sanchez | H01Q 25/001 |
| 2023/0180079 A1 | 6/2023 | Hwang et al. | |

FOREIGN PATENT DOCUMENTS

| | | |
|---|---|---|
| EP | 0 927 439 B1 | 2/2005 |
| KR | 10-2000-0068597 | 11/2000 |
| KR | 10-2005-0026205 | 3/2005 |
| KR | 10-1092752 | 12/2011 |
| KR | 10-2168766 | 10/2020 |
| KR | 10-2021-0095528 | 8/2021 |
| KR | 10-2022-0158015 | 11/2022 |
| TW | I249875 | 2/2006 |
| WO | 2021/098803 | 5/2021 |
| WO | 2021/196979 | 10/2021 |
| WO | 2021/208085 | 10/2021 |

OTHER PUBLICATIONS

Jiayin Guo, et al., "Meta-Surface Antenna Array Decoupling Designs for Two Linear Polarized Antennas Coupled in H-Plane and E-Plane", IEEE Access, vol. 7, Jul. 23, 2019, 19 pages.

International Search Report for PCT/KR2021/004491 dated Jul. 23, 2021, 5 pages.

Written Opinion of the ISA for PCT/KR2021/004491 dated Jul. 23, 2021, 5 pages.

Korean Office Action issued Jan. 5, 2024 in corresponding Korean Patent Application No. 10-2020-0047916.

European Examination Report dated Mar. 10, 2025 for EP Application No. 21793799.4.

* cited by examiner

Metal patch antenna fusion

ANTENNA DEVICE INCLUDING RADOME AND BASE STATION INCLUDING ANTENNA DEVICE

CROSS-REFERENCE TO RELATED APPLICATIONS

This application is a continuation of International Application No. PCT/KR2021/004491 designating the United States, filed on Apr. 9, 2021, in the Korean Intellectual Property Receiving Office and claiming priority to Korean Patent Application No. 10-2020-0047916, filed on Apr. 21, 2020, in the Korean Intellectual Property Office, the disclosures of which are incorporated by reference herein in their entireties.

BACKGROUND

Field

The disclosure relates to an antenna device used in a next-generation communication technology and a base station including the same.

Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which may refer, for example, to a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud Radio Access Network (RAN) as the above-described Big Data processing technology may also be considered to be as an example of convergence between the 5G technology and the IoT technology.

Next-generation communication systems may use higher frequency (sub-6 GHz) band, and beamforming technology for forming various beams may be applied so as to smoothly communicate in the higher frequency band. In the case of communication using a beam as described above, an antenna structure that may optimize a beam design in consideration of interference with an adjacent cell and a coverage area is required.

SUMMARY

According to an example embodiment of the disclosure, an antenna device in a wireless communication system may comprise: an antenna module including at least one antenna; and a radome covering at least a part of the antenna module, wherein the antenna module may include a first radiator disposed on one surface of the radome and at least one second radiator spaced apart from the first radiator by a specified distance on the one surface to form a loop of the first radiator, wherein the at least one second radiator may include a plurality of gaps opening each of the loops.

According to an example embodiment of the disclosure, a base station is provided comprising an antenna device in a wireless communication system, wherein the antenna device may include: an antenna module including at least one antenna and a radome covering at least a part of the antenna module, wherein the antenna module may include a first radiator disposed on one surface of the radome and at least one second radiator spaced apart from the first radiator by a specified distance on the one surface to form a loop of the first radiator, wherein the at least one second radiator may include a plurality of gaps opening each of the loops.

According to various example embodiments, a beam width that can adequately cover a specific area while minimizing and/or reducing interference with an adjacent cell can be designed.

In addition, according to various example embodiments, a beam having a specific directivity can be designed without changing the operating frequency band.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
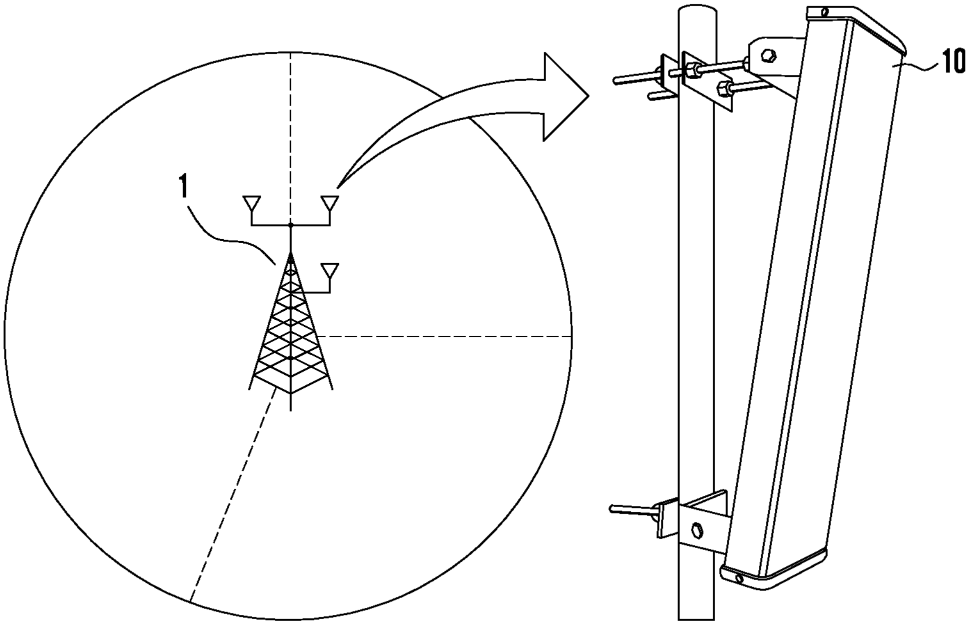
FIG. 1 is a diagram illustrating an example of a base station in a massive multiple input multiple output (MIMO) environment according to various embodiments.

In describing various example embodiments, a description of the technical contents well known in the technical field to which the disclosure belongs and not directly related to disclosure may be omitted to avoid obscuring the disclosure with unnecessary detail.

It will be understood that some components in the accompanying drawings are exaggerated, omitted, or schematically illustrated. In addition, the size of each component does not fully reflect the actual size. The same reference numerals are assigned to the same or corresponding components in each drawing.

Advantages and features of the disclosure and methods for achieving them will become apparent with reference to the embodiments described below in detail together with the accompanying drawings. However, the disclosure is not limited to the embodiments disclosed below, but may be implemented in various different forms.

FIG. 1 is a diagram illustrating an example of a base station in a massive multiple input multiple output (MIMO) environment according to various embodiments.

As previously disclosed, in the next-generation communication system, beamforming technology is applied to reduce the path loss of radio waves in the higher frequency band, and as an example of applying this, the base station may include a plurality of antenna devices respectively covering a specific directionality of the coverage at a predetermined angle.

In FIG. 1, for example, 3-sector base station 1 dividing coverage into three sectors is illustrated, and each antenna device covering each sector may include an antenna module for transmitting and receiving radio signals and a radome 10 covering the antenna module.

The structure of each antenna device will be described in greater detail below with reference to FIGS. 2 and 3.

Figure 2:
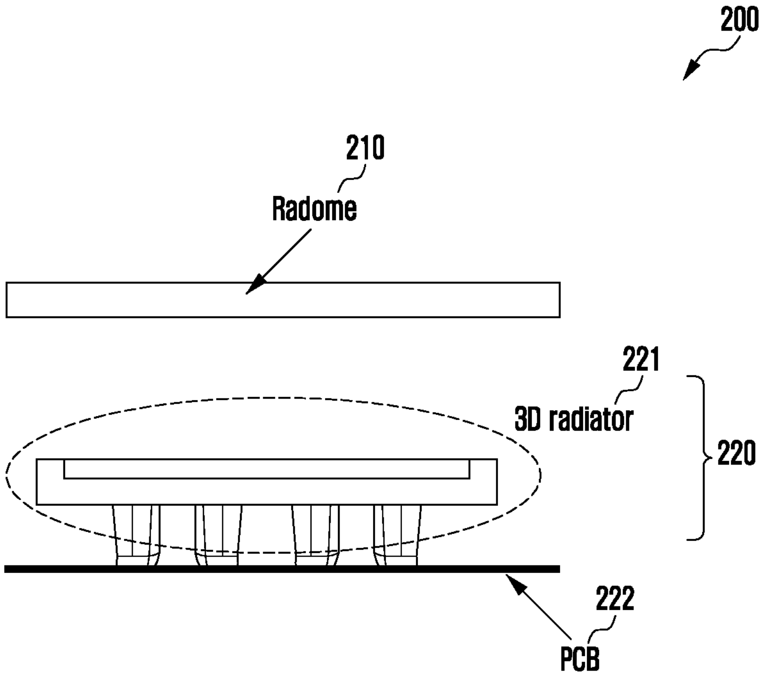
FIG. 2 is diagram illustrating a side view of an example structure of an antenna device according to various embodiments.
Figure 3:
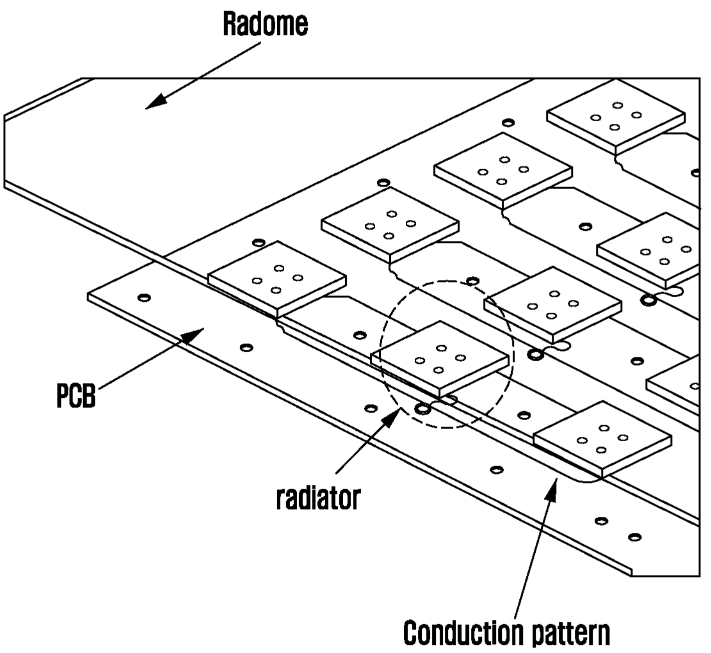
FIG. 3 is a partial perspective view illustrating an example structure of an antenna device according to various embodiments.

FIG. 2 is a diagram illustrating side view of an example structure of an antenna device according to various embodiments, and FIG. 3 is a partial perspective view illustrating an example structure of an antenna device according to various embodiments.

Referring to FIG. 2, an antenna device 200 may include an antenna module (e.g., including an antenna) 220 and a radome 210 covering at least a part of the antenna module. For example, the antenna module 220 according to an embodiment may include a wireless communication chip or a printed circuit board (PCB) 222 that supplies a radio frequency (RF) signal for antenna operation, and a radiator 221 that radiates the RF signal. Although not illustrated in the drawings, the antenna device 200 may further include a feeding unit for supplying an electrical signal supplied from the PCB 222 to the radiator 221, and a divider for distributing the RF signal.

As illustrated in FIGS. 2 and 3, in the antenna device 200 according to an embodiment, a radiator is disposed on one surface of the PCB to transmit an electrical signal to the radiator through a conductive pattern, and a radome may be disposed to cover the antenna module from the outside by being spaced apart from the upper surface of the radiator by a predetermined distance.

In beamforming, an antenna design capable of optimizing a beam width is required.

Figure 4:
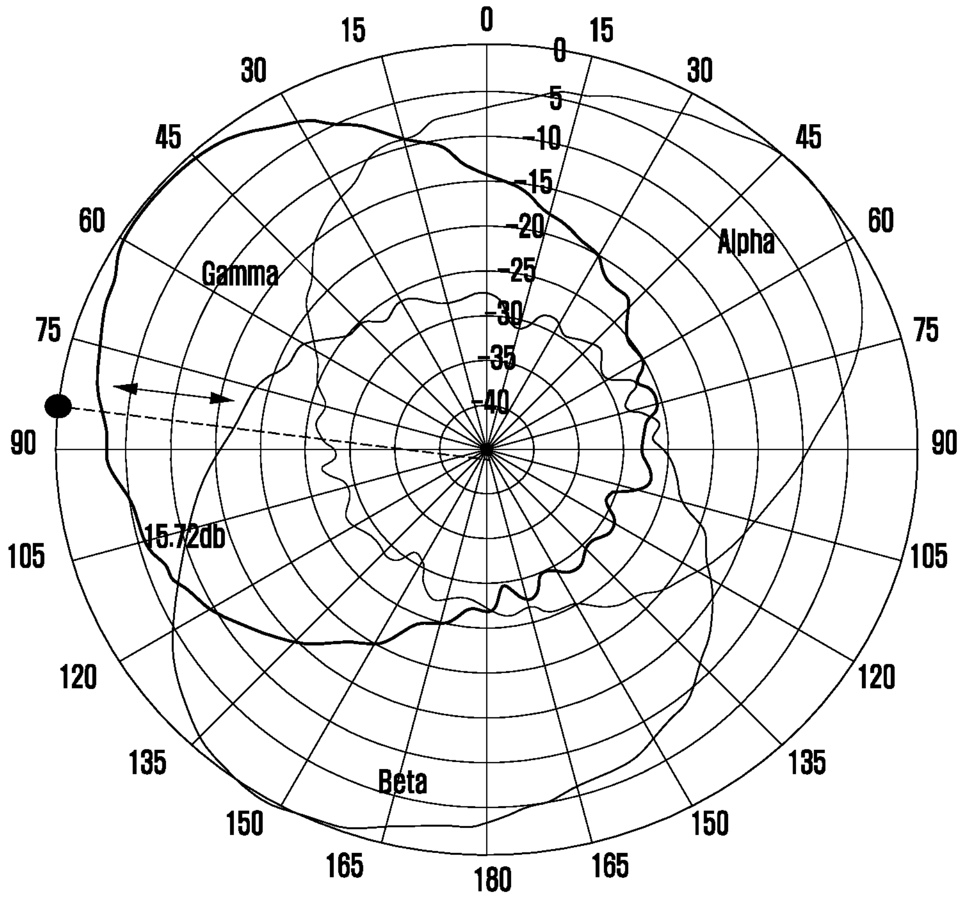
FIG. 4 is a graph illustrating an example in which a beam width of a 3-sector base station is radiated according to various embodiments.
Figure 5:
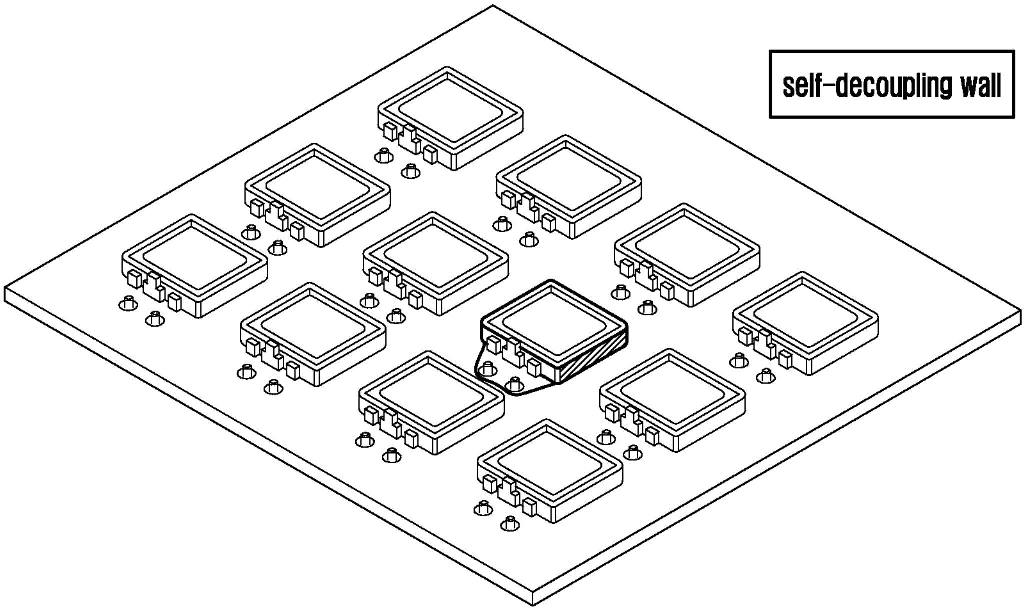
FIG. 5 is a perspective view illustrating an example of a method of optimizing a beam width according to various embodiments.

FIG. 4 is a graph illustrating an example in which a beam width of a 3-sector base station is radiated according to various embodiments, FIGS. 5 and 6B are perspective views illustrating an example of a method of optimizing a beam width according to various embodiments.

Referring to FIG. 4, according to an embodiment, an example of a beam width radiated by a base station covering the service area in three sectors may be identified. As such, the beam radiated from each antenna device needs to be appropriately designed to minimize and/or reduce interference with adjacent cells and to properly cover a service area.

For example, there is a method of adjusting a gap between antenna elements in order to secure the beam width radiated from each antenna device disposed in the base station. However, for example, when the gap between antenna elements is reduced, the beam width radiated may be secured, but interference between antenna elements may lead to poor performance. In addition, an interference problem between adjacent cells may occur due to the beam being radiated outside the set area.

Figure 6:
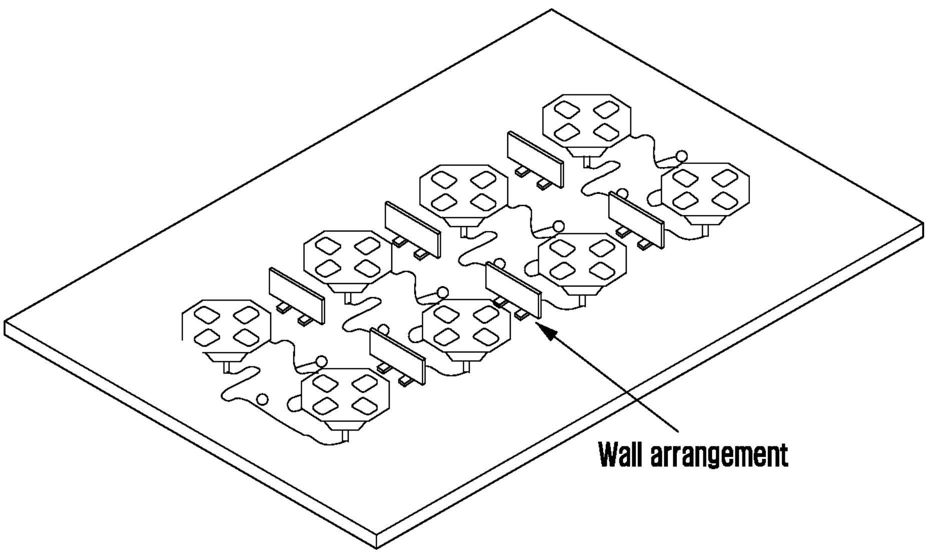
FIG. 6 is a perspective view illustrating an example of a method of optimizing a beam width according to various embodiments.

Referring to FIGS. 5 and 6, in order to address such a problem, a method of using an external structure while maintaining an existing antenna arrangement may be applied. For example, the problem of interference between antenna elements may be partially addressed by self-decoupling a wall to be decoupled from each antenna as illustrated in FIG. 5 or by installing a wall between the antennas as illustrated in FIG. 6.

However, there is a limit in designing various beam widths radiated in a predetermined (e.g., specified) direction and in a specific angular range using only the above-described methods.

Hereinafter, referring to the accompanying drawings, a structure of an antenna device according to various embodiments capable of diversifying and optimizing a beam width without changing an operating frequency will be described.

Figure 7:
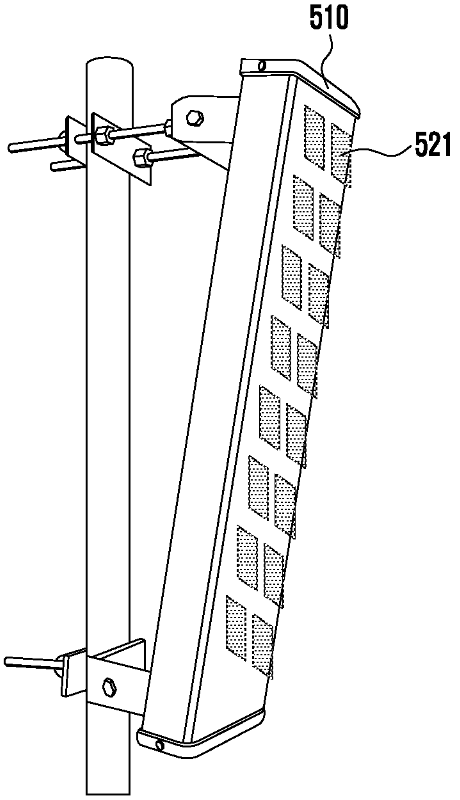
FIG. 7 is a diagram illustrating an example structure of an antenna device according to various embodiments.
Figure 8:
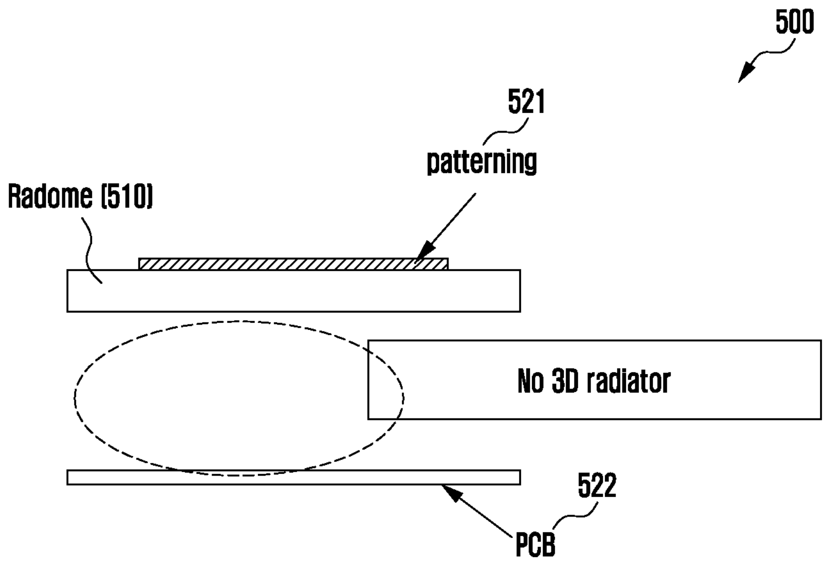
FIG. 8 is a diagram illustrating a side view of an example structure of an antenna device according to various embodiments.
Figure 9:
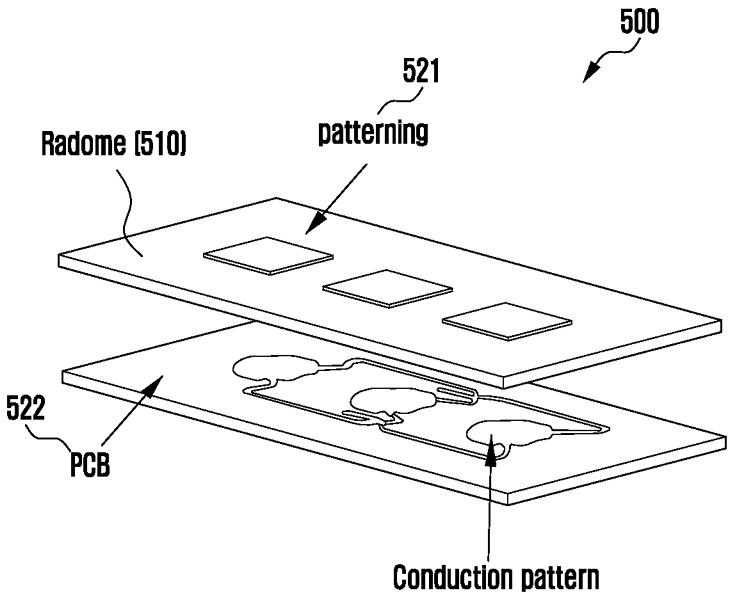
FIG. 9 is an exploded perspective view illustrating an example structure of an antenna device according to various embodiments.
Figure 10:
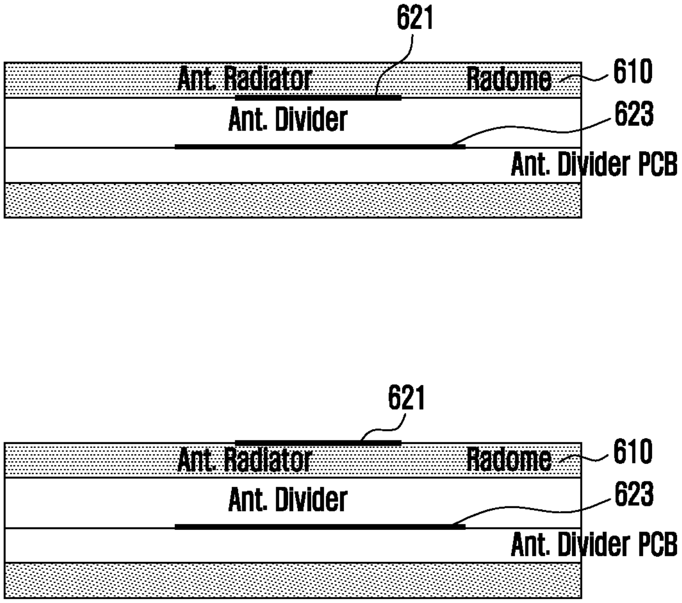
FIG. 10 is a cross-sectional view illustrating an example in which a radiator is disposed in a radome according to various embodiments.

FIG. 7 is a diagram illustrating an example structure of an antenna device according to various embodiments, FIG. 8 is a diagram illustrating a side view of an example structure of an antenna device according to various embodiments, and FIG. 9 is an exploded perspective view illustrating an example structure of an antenna device according to various embodiments. In addition, FIG. 10 is a diagram illustrating an example in which a radiator is disposed in a radome according to various embodiments.

An antenna device according to an embodiment may include an antenna module and a radome covering at least a part of the antenna module. An antenna module according to an embodiment may include, for example, the above-described configurations in FIG. 2. The antenna device according to an embodiment may be implemented by attaching the radiator of the antenna module on the radome to optimize a beam width design.

For example, referring to FIG. 7, at least one radiator 521 may be patterned in a predetermined manner on one surface of the radome 510 of the antenna device according to an embodiment. For example, as illustrated in FIG. 8, a radiator 521 may be disposed on one surface of the radome 510 that is spaced apart from the printed circuit board (PCB) 522 by a predetermined distance and disposed to cover the PCB 522. In this case, for example, a feeding unit that transmits RF signals to the radiator may be not directly connected to the radiator 521, and may be disposed on the PCB 522 illustrated in FIG. 9 to form a gap-coupled structure with the radiator 521 disposed in the radome 510. However, the arrangement of the feeding unit and the structure of the radiator are not limited to the illustrated embodiment (gap-coupled structure).

According to the structure according to various embodiments, without adjusting a gap between separate external structures or antenna elements, beam width optimization and various beam width designs may be possible by implementing the radiator patterned on the radome in various structures.

In the above example, for example, the radiator 621 according to an embodiment may be disposed on a lower surface of the radome 610 based on a direction in which the beam is radiated as illustrated at the top of FIG. 10, and may be disposed on an upper surface of the radome 610 as illustrated at a lower end of FIG. 10. In this case, the radiator disposed on the upper surface, or the lower surface of the radome may maintain a predetermined distance from the feeding unit 623. For example, the top surface of the radiator disposed in the radome may be spaced apart from the upper surface of the feeding unit disposed on the plate-shaped PCB by a predetermined distance.

Figure 11:
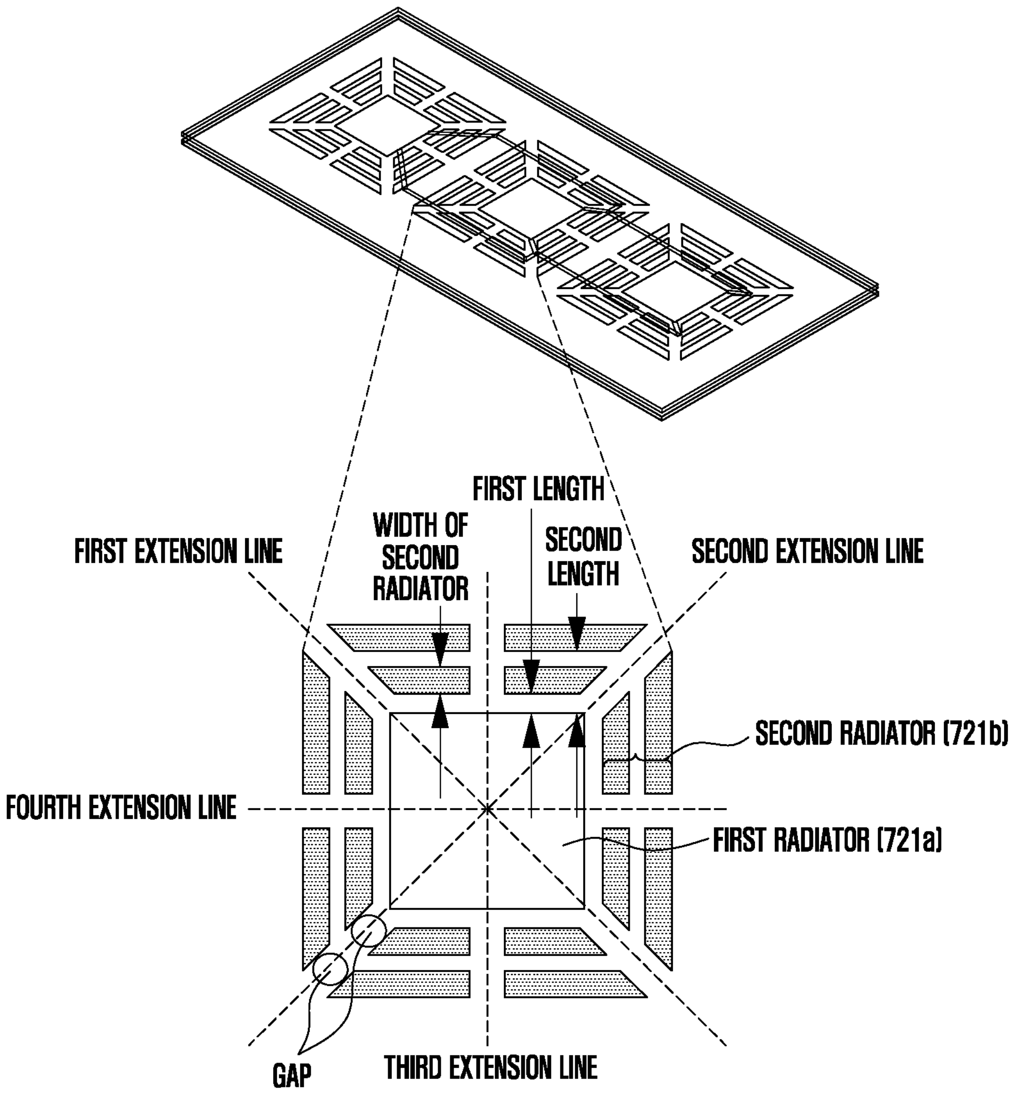
FIG. 11 is a diagram illustrating an example structure of a radiator disposed on one surface of a radome according to various embodiments.

FIG. 11 is a diagram illustrating an example structure of a radiator disposed on one surface of a radome according to various embodiments.

As an example of changing the beam width, a method of adjusting a size of the radiator radiating the beam may be considered. For example, as the size of the radiator decreases, a beam width increases, and as the size of the radiator increases, a beam having a specific directivity may be formed. However, according to this method, the beam width may be adjusted according to the size of the radiator, but as the beam width changes, the operating frequency of the beam also changes.

In order to address this problem, the antenna module according to an embodiment may implement at least two radiators on the radome in a particular manner.

For example, referring to FIG. 11, the antenna module according to an embodiment may include a first radiator 721*a* disposed to have a predetermined size and shape on one surface of the radome, and at least one second radiator 721*b* formed to surround the first radiator 721*a* with a predetermined width while having a predetermined distance from the first radiator 721*a* on one surface of the radome. In this case, at least one second radiator 721*b* may form a loop with respect to the first radiator 721*a* in the same shape as the shape of the first radiator 721*a*.

In FIG. 11, the first radiator 721*a* is illustrated in, for example, a square shape (or a patch shape) having a predetermined size, but is not limited thereto, and although it is illustrated that two second radiators 721*b* are implemented, the number of second radiators 721*b* may be variously set.

As an example, according to FIG. 11, the first radiator 721*a* having a square shape having a size based on an interval of wavelengths, the second radiator 721*b* spaced apart from the first radiator by a predetermined first length to form a first loop of the first radiator, and the second radiator 721*b* spaced apart from the first radiator by a predetermined second length to form a second loop of the first radiator may be disposed on one surface of the radome.

In addition, at least a loop corresponding to each of the second radiators 721*b* may be formed to have a predetermined width. The size of the width in which each of the at least one second radiator is formed and the distance between the first radiator 721*a* and at least one second radiator 721*b* may be set in various ways based on how to design the beam width to be radiated from the antenna device.

According to an embodiment, each loop corresponding to the second radiator 721*b* may include a plurality of gaps for maintaining an operating frequency of a beam width to be radiated. In other words, each loop corresponding to the second radiator may be a form of opening by the plurality of gaps rather than a closed loop.

A plurality of gaps may be formed at a point where the extension line extending through the first radiator 721_a_ and the at least one second radiator 721_b_ in a specific direction, and at least one second radiator 721_b_ contact each other.

For a more specific example, the at least one second radiator 721_b_ may form at least two gaps at each of two points where the first extension line extending through the first radiator 721_a_ in the first direction and the at least one second radiator 721_b_ meet (come into contact with). In addition, at least two gaps may be formed at each of the two points where the second extension line, extending through the first radiator 721_a_ and the at least one second radiator 721_b_ in a second direction orthogonal to the first direction, and at least one second radiator 721_b_ contact each other. In this case, the loop corresponding to each of the at least one second radiator 721_b_ may include at least four gaps.

In an embodiment, the first direction may correspond to a direction in which a feeding unit for supplying an RF signal to each of the first radiator 721_a_ and at least one second radiator 721_b_ is formed. For example, when the feeding unit includes a first feeding unit that supplies an electrical signal related to horizontal polarization and a second feeding unit that supplies an electrical signal related to vertical polarization, the first direction may correspond to a direction in which the first feeding unit is formed, and the second direction may correspond to a direction in which the second feeding unit is formed.

For another example, at least four more gaps may be formed at each of two points where the third extension line and at least one second radiator meet (come into contact with) and two points where the fourth extension line and at least one second radiator meet (come into contact with). The third extension line is a third direction having a predetermined angle with the first extension line, and the fourth extension line is a fourth direction having a predetermined angle with the second extension line. As illustrated in the drawings, the predetermined angle may be, for example, 45 degrees, but is not limited thereto. In this case, each of the at least one second radiator may include at least 8 gaps.

According various embodiments, due to the structure, which adjusts the width, number, and number of gaps of the first radiator disposed on one surface of the radome and the second radiator surrounding the first radiator, a beam width having a specific directivity may be variously designed without changing an operating frequency without the addition of a separate external structure or the structural change of the antenna device. How the radiator structure according to various embodiments may minimize and/or reduce errors in changing operating frequencies or forming specific beam widths will be described in greater detail below with reference to FIGS. 12, 13, and 14.

Figure 12:
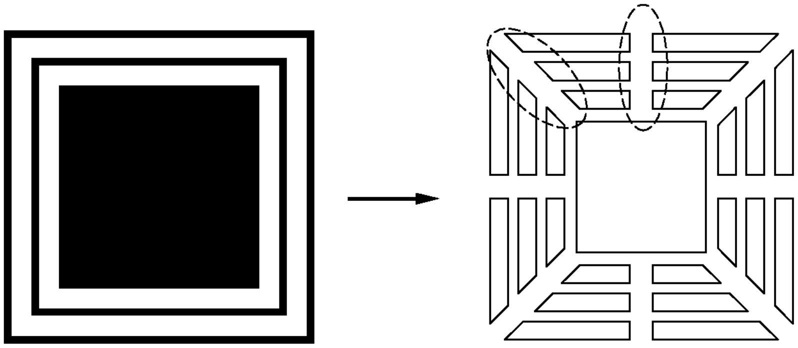
FIG. 12 is a diagram illustrating an example gap included in a second radiator according to various embodiments.
Figure 13:
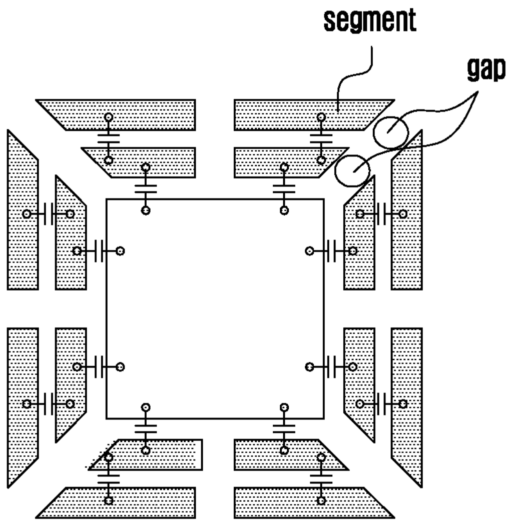
FIG. 13 is a diagram illustrating an example structure of a capacitor for maintaining an operating frequency band of a beam according to various embodiments.
Figure 14:
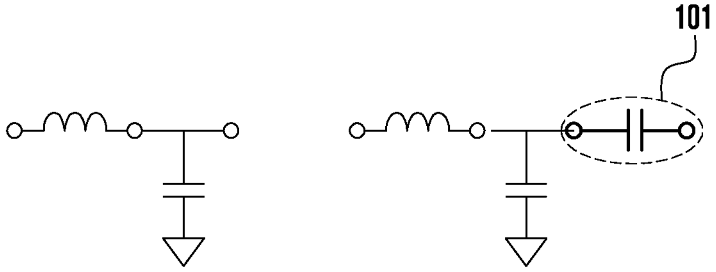
FIG. 14 is a circuit diagram illustrating an example structure of a capacitor for maintaining an operating frequency band of a beam according to various embodiments.

FIG. 12 is a diagram illustrating a gap included in a second radiator according to various embodiments, and FIGS. 13 and 14 are diagrams illustrating an example structure of a capacitor for maintaining an operating frequency band of a beam according to various embodiments.

Referring to FIG. 12, a case in which a gap is included in the second radiator according to an embodiment and a case in which the gap is not included is illustrated. As described above, in the case of simply increasing the number of second radiators to form a beam having a specific directivity, for example, when the second radiator is formed in the form of a plurality of closed loops with respect to the first radiator as shown on the left, a loop current may be generated to generate a higher-order mode, and accordingly, an error in designing a beam width having a specific directivity may occur.

However, as shown on the right, when the second radiator is implemented as an open loop so that a plurality of gaps are included in the closed loop, a beam width design with a specific directivity may be optimized by minimizing and/or reducing the generation of higher-order mode.

In addition, the radiator according to an embodiment may further form a capacitance between the first radiator and at least one second radiator.

As a more specific example, referring to FIG. 13 according to an embodiment, the radiator disposed in the radome may include a first radiator, a second radiator spaced apart from the first radiator by a first length to form a first loop with respect to the first radiator, and a second radiator spaced apart from the first radiator by a second length to form a second loop with respect to the first radiator. In addition, as illustrated in FIG. 13, each of the first loop and the second loop may include eight gaps. For convenience of description, in the first and second loops, components divided by each gap will be referred to as segments.

As illustrated in FIG. 13, a capacitor may be connected in series between the first radiator and the segments of the first loop, respectively. For example, the number of capacitors added between each segment of the first loop and the first radiator may be equal to the number of segments or gaps. Likewise, capacitors may be connected in series between each segment of the first loop and each segment of the second loop.

As the capacitors are connected in series as described above, a problem in which a resonance frequency is shifted may be prevented and/or reduced. In other words, when implementing only radiators without the addition of capacitors, as shown on the left of FIG. 14, since only the inductor and the capacitor are connected, a problem of resonant frequency shift may occur when antenna enlargement is applied. However, as shown on the right of FIG. 14, since capacitance canceling may be applied by adding the series capacitor 101 for preventing/reducing the resonant frequency shift, it is possible to design various beam widths while maintaining a desired operating frequency bandwidth.

Figure 15:
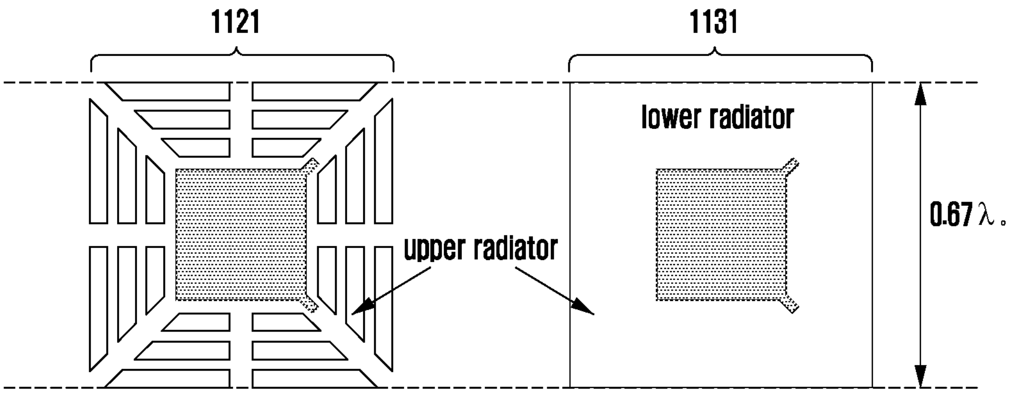
FIG. 15 is a diagram comparing an example structure of a radiator and a common radiator according to various embodiments.
Figure 16:
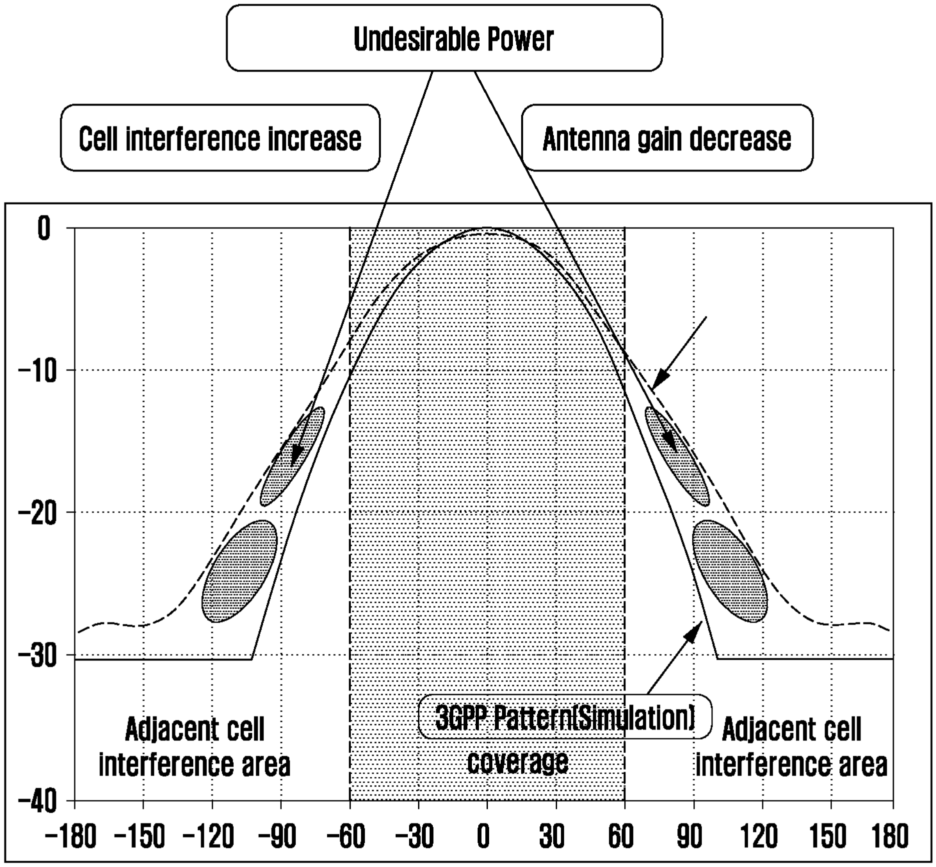
FIG. 16 is a graph comparing beam width design effects between the radiators illustrated in FIG. 15 according to various embodiments.
Figure 17:
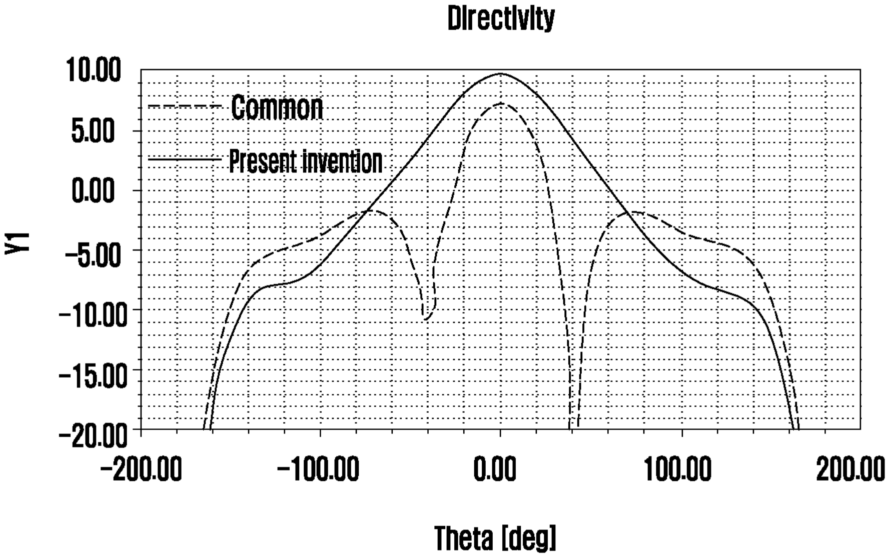
FIG. 17 is a graph comparing beam width design effects between the radiators illustrated in FIG. 15 according to various embodiments.
Figure 18:
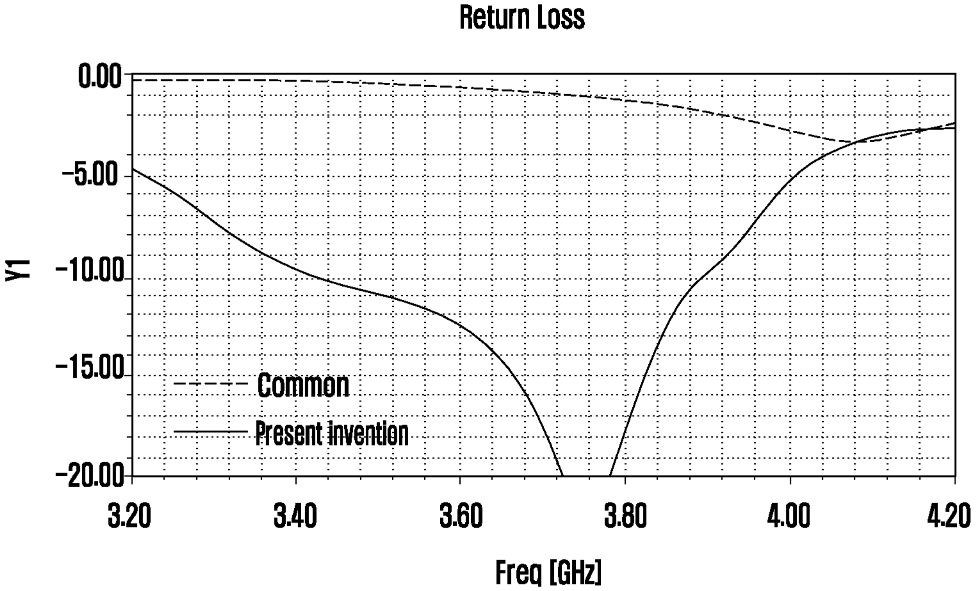
FIG. 18 is a graph comparing beam width design effects between the radiators illustrated in FIG. 15 according to various embodiments.

FIG. 15 is a diagram comparing an example structure of a radiator and a common radiator according to various embodiments, FIGS. 16, 17, and 18 are graphs comparing beam width design effects between the radiators illustrated in FIG. 15 according to various embodiments.

Referring to FIG. 15, a radiator 1121 according to an embodiment including a first radiator and at least one second radiator is illustrated in the case of the left side, and a common radiator 1131 implemented in a patch shape is illustrated in the case of the right side. When the two radiators shown in FIG. 15 are applied to the antenna device, different effects are derived in designing the beam width.

For example, referring to FIG. 16, when the structure of a radiator according to an embodiment is applied, the effect of how well a specific service area can be covered may be identified. In FIG. 16, a solid line illustrates a case in which a radiator structure according to an embodiment is applied, and the dotted line illustrates a case in which a common radiator structure is applied. According to FIG. 16, when a radiator according to an embodiment is applied, since interference between adjacent cells is minimized/reduced, the effect of maximizing/increasing the antenna gain with an appropriate coverage area may be identified.

Referring to FIG. 17, a directivity effect related to whether a beam width in a specific direction can be well designed may be identified. Referring to the dotted line in FIG. 17, when a common radiator structure is enlarged to increase directivity, the beam pattern is damaged due to the high-order mode, but according to an embodiment, as illustrated by a solid line, it may be identified that a beam width concentrated in a specific direction is designed since a high-order mode does not occur.

Referring to FIG. 18, a result of return loss related to whether a desired beam is well radiated through a radiator may be identified. When a common radiator structure is enlarged as shown in the dotted line of FIG. 18, while the resonant frequency moves to a lower band, the beam is not radiated well and is reflected back to the input stage, showing a return loss close to 0 dB, however, according to various embodiments, it may be identified that the resonance frequency is maintained within the band and radiation is appropriately performed.

Hereinafter, the effect of changing the beam width due to the change in the radiator structure in accordance with an embodiment will be described in greater detail below with reference to FIGS. 19 and 20.

Figure 19:
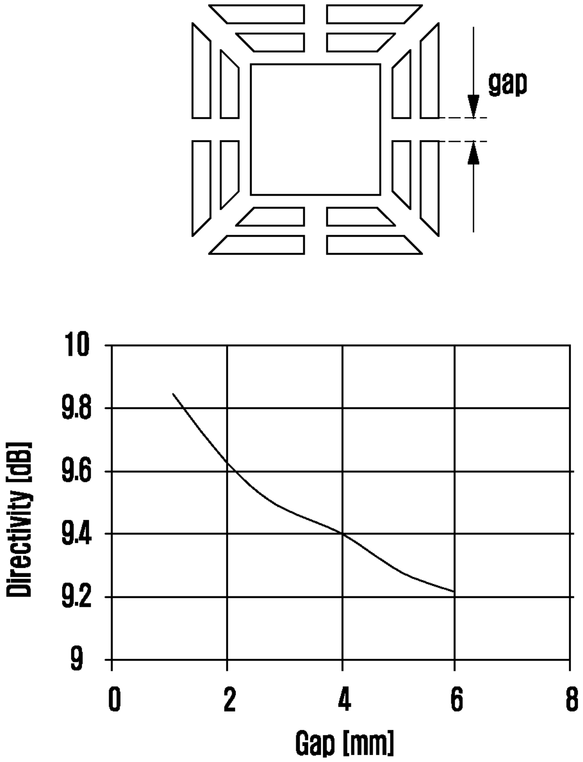
FIG. 19 is a diagram and graph illustrating a beam width change according to a gap size of a second radiator according to various embodiments.

FIG. 19 is a diagram illustrating an example beam width change according to a gap size of a second radiator according to various embodiments, and FIG. 19 is a diagram illustrating an example beam width change according to a change in the number of second radiators according to various embodiments.

The beam width may be changed by adjusting the size of the gap opening the loop of the second radiator according to an embodiment.

Referring to FIG. 19, the size of the illustrated gap may be formed to be at least a predetermined size or more. At this time, it may be identified that the directivity of the beam increases as the size of the gap approaches a predetermined size, and that the directivity of the beam decreases, as the size of the gap increases, because coupling to the surrounding loading structure becomes weaker.

As described above with reference to FIG. 11, as the size of the radiator according to an embodiment increases, the directivity of the radiating beam may increase.

Figure 20:
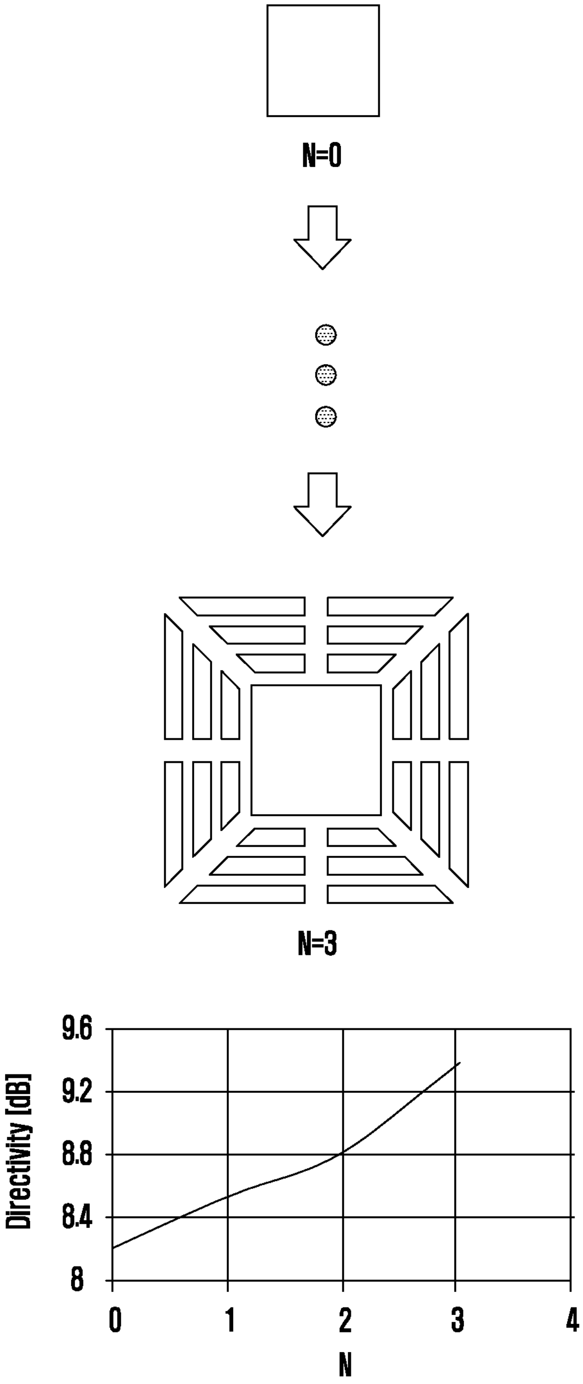
FIG. 20 is a diagram and graph illustrating a beam width change according to a change in the number of second radiators according to various embodiments.

As shown in FIG. 20, it may be identified that as the number of second radiators according to an embodiment increases, the directionality of the beam increases because the antenna enlargement effect may be derived.

As described above, according to an embodiment, various beams may be easily designed by adjusting the gap between the first radiator and the second radiator, the gap between the second radiators, the size and number of gaps included in the second radiator, the number of second radiators, and the width of the loop of the second radiator, without additional external structures or modification of antenna structures.

Figure 21:
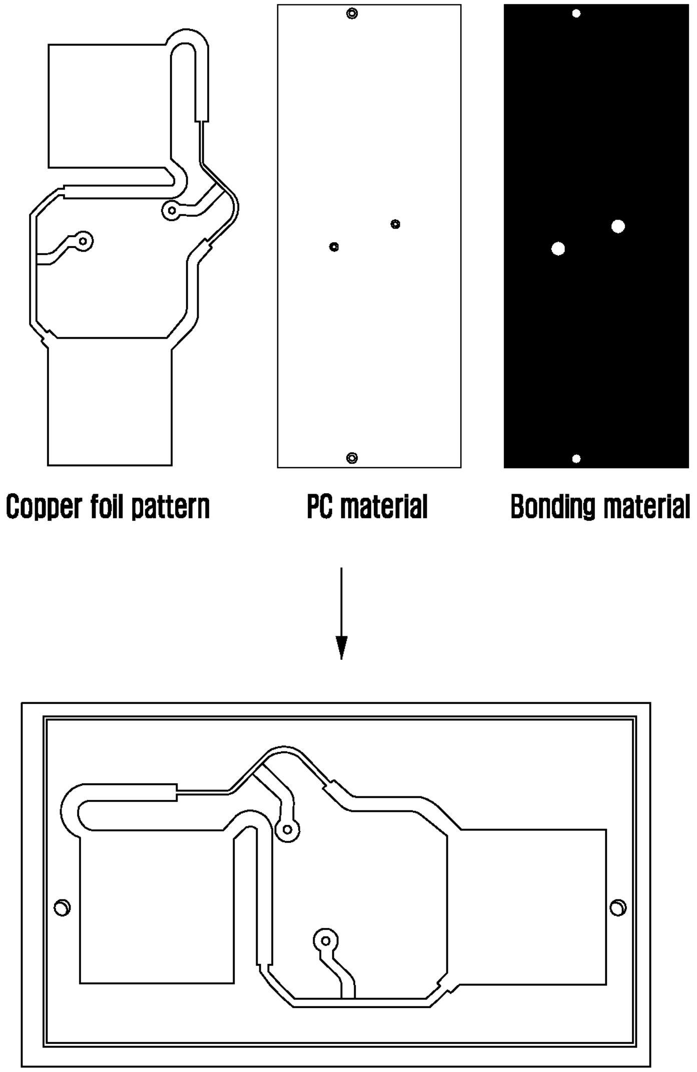
FIG. 21 is a diagram illustrating an example printing pattern bonding technique for implementing a radiator according to various embodiments.
Figure 22:
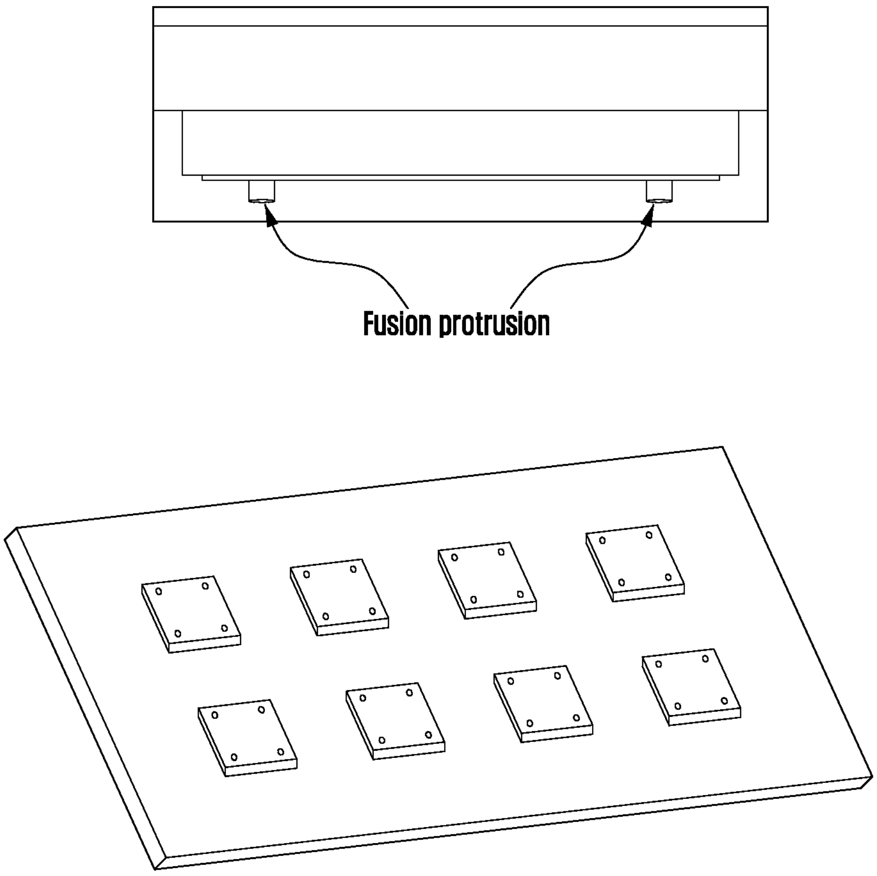
FIG. 22 is a diagram illustrating an example fusion technique for implementing a radiator according to various embodiments.
Figure 23:
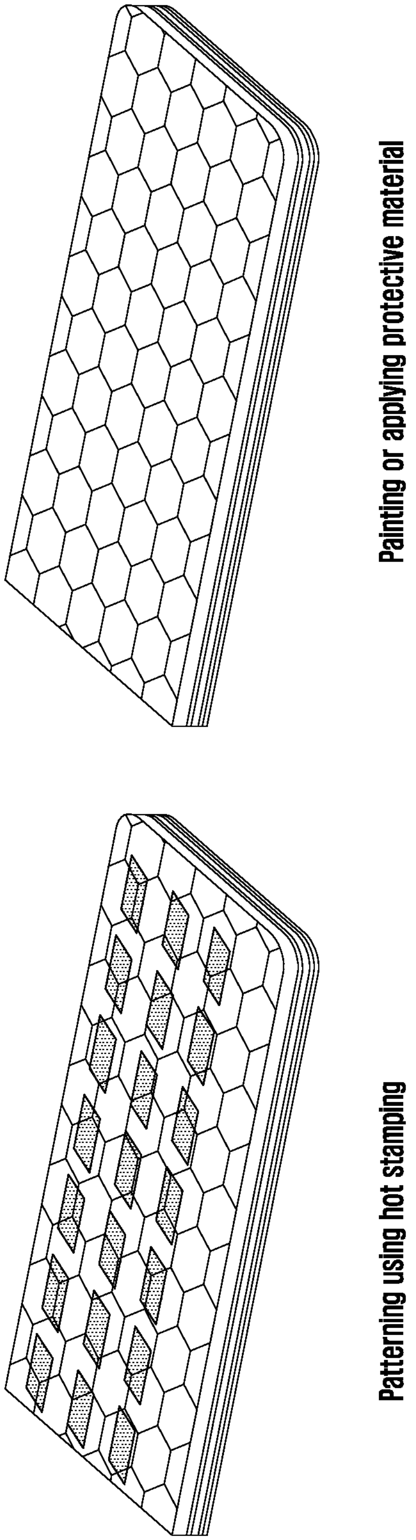
FIG. 23 is a diagram illustrating an example hot stamping technique for implementing a radiator according to various embodiments.

FIGS. 21, 22, and 23 are diagrams illustrating an example method of implementing an antenna device including a radiator according to various embodiments.

FIG. 21 is a diagram illustrating a printing pattern bonding technique for implementing a radiator according to various embodiments, FIG. 22 is a diagram illustrating a fusion technique for implementing a radiator according to various embodiments, and FIG. 23 is a diagram illustrating a hot stamping technique for implementing a radiator according to various embodiments.

The radiator of the antenna device according to an embodiment may be implemented on an upper surface or a lower surface of the radome in various ways.

For example, a radiator of an antenna device according to an embodiment may be implemented based on various methods such as a method of bonding and implementing a printed film as shown in FIG. 21, a method of fusion to the metal patch antenna as shown in FIG. 22, a patterning method using hot stamping as shown in FIG. 23, and a spray method using, for example, ARC spray.

The antenna device according to an embodiment may be disposed in various kinds of base stations and operated according to a communication method such as Multiple user-MIMO (MU-MIMO), massive-MIMO, or the like. The base station according to an embodiment may include, for example, a base transceiver station (BTS), a digital unit (DU), a Remote Radio Head (RRH), or the like.

While the disclosure has been illustrated and described with reference to various example embodiments, it will be understood that the various example embodiments are intended to be illustrative, not limiting. It will also be understood by those skilled in the art that various changes in form and detail may be made without departing from the true spirit and full scope of the disclosure including the appended claims and their equivalents. It will also be understood that any of the embodiment(s) described herein may be used in conjunction with any other embodiment(s) described herein.

What is claimed is:

1. An antenna device for use in a wireless communication system comprising:

a printed circuit board (PCB) including a feeding portion configured to supply a signal;

a radiating portion; and a radome covering at least the PCB and being spaced apart from the PCB, wherein the radiating portion includes a first radiator disposed on a surface of the radome, and at least one second radiator disposed on the surface of the radome and spaced apart from the first radiator, wherein the at least one second radiator is spaced apart from the first radiator by a specified distance on the surface of the radome to form at least one loop around the first radiator, wherein the at least one second radiator includes a plurality of gaps opening each of the at least one loop, and wherein the plurality of gaps include at least two gaps per polarization of the signal supplied from the feeding portion.

2. The antenna device of claim 1, wherein the plurality of gaps comprise:

at least two gaps formed at a first point and a second point where a first extension line extending to penetrate the at least one second radiator in a first direction and a loop are in contact; and at least two gaps formed at a third point and a fourth point where a second extension line extending to penetrate the at least one second radiator in a second direction orthogonal to the first direction and the loop are in contact.

3. The antenna device of claim 2, wherein the feeding portion of the PCB comprises:

a first feeding portion comprising a conductive material configured to supply the signal to the first radiator and the at least one second radiator, along the first direction; and a second feeding portion comprising a conductive material configured to supply the signal to the first radiator and the at least one second radiator, along the second direction.

4. The antenna device of claim 2, wherein the plurality of gaps further comprise:

at least two gaps formed at a fifth point and a sixth point where each of a third extension line extending to penetrate the at least one second radiator in a third direction and the loop are in contact; and at least two gaps formed at a seventh point and an eighth point where each of a fourth extension line extending to penetrate the at least one second radiator in a fourth direction and the loop are in contact.

5. The antenna device of claim 1, wherein the feeding portion is configured to supply the signal to each of the first radiator and the at least one second radiator.

6. The antenna device of claim 1, wherein the radome is spaced apart from the PCB by a predetermined distance and is disposed to cover the PCB from outside of the antenna device.

7. The antenna device of claim 1, wherein the at least one second radiator includes a first loop spaced apart from the first radiator by a specified distance, wherein the radiating portion further includes a plurality of capacitors connecting the first radiator and the first loop, and wherein a number of the plurality of capacitors is equal to a number of gaps included in the first loop.

8. The antenna device of claim 1, wherein the surface of the radome is an upper surface or a lower surface of the radome, wherein the feeding portion is disposed on a surface of the PCB, and wherein the surface of the PCB faces the lower surface of the radome.

9. The antenna device of claim 1, wherein a gap-coupled structure in which the feeding portion disposed on a surface of the PCB is indirectly coupled to the radiating portion on the surface of the radome is formed without a contact between the feeding portion and the radiating portion.

10. A base station comprising an antenna device configured for use in a wireless communication system, wherein the antenna device comprises:

a printed circuit board (PCB) including a feeding portion configured to supply a signal, a radiating portion, and a radome covering at least the PCB and being spaced apart from the PCB, wherein the radiating portion includes a first radiator disposed on a surface of the radome and at least one second radiator disposed on the surface of the radome and spaced apart from the first radiator, wherein the at least one second radiator is spaced apart from the first radiator by a specified distance on the surface of the radome to form at least one loop around the first radiator, wherein the at least one second radiator includes a plurality of gaps opening each of the at least one loop, and wherein the plurality of gaps include at least two gaps per polarization of the signal supplied from the feeding portion.

11. The base station of claim 10, wherein the plurality of gaps comprise:

at least two gaps formed at a first point and a second point where a first extension line extending to penetrate the at least one second radiator in a first direction and a loop are in contact; and at least two gaps formed at a third point and a fourth point where a second extension line extending to penetrate the at least one second radiator in a second direction orthogonal to the first direction and the loop are in contact.

12. The base station of claim 11, wherein the feeding portion of the PCB further comprises:

a first feeding portion comprising a conductive material configured to supply the signal to the first radiator and the at least one second radiator, along the first direction; and a second feeding portion comprising a conductive material configured to supply the signal to the first radiator and the at least one second radiator, along the second direction.

13. The base station of claim 11, wherein the plurality of gaps further comprise:

at least two gaps formed at a fifth point and a sixth point where a third extension line extending to penetrate the at least one second radiator in a third direction and the loop are in contact; and at least two gaps formed at a seventh point and an eighth point where a fourth extension line extending to penetrate the at least one second radiator in a fourth direction and the loop are in contact.

14. The base station of claim 10, wherein the feeding portion is configured to supply the signal to each of the first radiator and the at least one second radiator.

15. The base station of claim 10, wherein the radome is spaced apart from the PCB by a predetermined distance and is disposed to cover the PCB from outside of the antenna device.

16. The base station of claim 10, wherein the at least one second radiator includes a first loop spaced apart from the first radiator by a specified distance, wherein the radiating portion further includes a plurality of capacitors connecting the first radiator and the first loop, and wherein a number of the plurality of capacitors is equal to a number of gaps included in the first loop.

17. The base station of claim 10, wherein the surface of the radome is an upper surface or a lower surface of the radome, wherein the feeding portion is disposed on a surface of the PCB, and wherein the surface of the PCB faces the lower surface of the radome.

18. The base station of claim 10, wherein a gap-coupled structure in which the feeding portion disposed on a surface of the PCB is indirectly coupled to the radiating portion on the surface of the radome is formed without a contact between the feeding portion and the radiating portion.

* * * * *